US008180122B2

(12) United States Patent
Allen (10) Patent No.: US 8,180,122 B2
(45) Date of Patent: May 15, 2012

(54) ERGONOMIC FINGER GUIDE FOR BIOMETRIC FINGER SCANNER

(75) Inventor: Robert Allen, Windermere, FL (US)

(73) Assignee: Disney Enterprise, Inc., Burbank, CA (US)

( * ) Notice: Subject to any disclaimer, the term of this patent is extended or adjusted under 35 U.S.C. 154(b) by 1083 days.

(21) Appl. No.: 11/703,881

(22) Filed: Feb. 8, 2007

(65) Prior Publication Data

US 2008/0192993 A1   Aug. 14, 2008

(51) Int. Cl.
*G06K 9/00* (2006.01)
(52) U.S. Cl. ....................................................... 382/126
(58) Field of Classification Search .................. 382/126
See application file for complete search history.

(56) References Cited

U.S. PATENT DOCUMENTS

| 4,792,226 | A | * | 12/1988 | Fishbine et al. | 356/71 |
| 5,210,797 | A | * | 5/1993 | Usui et al. | 382/126 |
| 5,412,463 | A | * | 5/1995 | Sibbald et al. | 356/71 |
| 5,546,471 | A | * | 8/1996 | Merjanian | 382/124 |
| 6,950,541 | B1 | * | 9/2005 | Setlak et al. | 382/126 |
| 7,146,029 | B2 | * | 12/2006 | Manansala | 382/126 |
| 7,327,861 | B2 | * | 2/2008 | Choshi et al. | 382/124 |

* cited by examiner

*Primary Examiner* — Bhavesh Mehta
*Assistant Examiner* — Barry Drennan
(74) *Attorney, Agent, or Firm* — Cantor Colburn LLP (57) ABSTRACT

A finger guide device for a biometric fingerprint scanner, the device including a raised portion, a channel formed into the raised portion and extending from about a front side of the raised portion to about a rear side thereof, an aperture formed through the device at the channel, finger selection contours configured to visually indicate to a user to place an index finger in the channel, and finger direction contours configured to direct a finger placed in the channel toward the aperture.

21 Claims, 8 Drawing Sheets

ERGONOMIC FINGER GUIDE FOR BIOMETRIC FINGER SCANNER

BACKGROUND

1. Field of the Invention

Embodiments of the invention relate generally to biometric identification devices, and in particular to an ergonomic device that facilitates fingerprint scanning.

2. Discussion of the Related Art

Biometrics generally concern the automatic identification of a person based upon physiological or behavioral characteristics. That is, a biometric identification system is essentially a pattern recognition system which makes a personal identification by determining the authenticity of a specific physiological or behavior characteristic possessed by the user. Common physiological biometric systems involve face, iris, and fingerprint matching, retinal scans, speech signatures, and hand geometry.

Fingerprint matching biometric systems generally include an optical or capacitance scanner disposed in a housing beneath a glass platen and a processor disposed in communication with the scanner. When a user places a finger on the platen, the respective fingerprint is scanned by the optical or capacitance scanner and the print is analyzed by the processor and compared against stored fingerprints. If the print is recognized, access is granted.

For proper operation of a fingerprint biometric system, it is critical that the user place the correct finger (i.e., the finger containing the print stored in the processor) on the platen in the correct position relative to the scanner device. Placement of a non-designated, incorrect finger will result in a determination of non-recognition even if the system processor has record of the user's print of a designated finger. Improper or partial placement of even the correct designated finger relative to the platen will result in improper scanning and, thus, access denial. These types of denials are known as "false rejections".

Issues of proper finger selection and correct platen finger placement are critical in biometric fingerprint systems used in high volume areas such as in airports, office buildings, and amusement parks. These systems experience numerous and rapid access attempts and can be largely disabled by high numbers of false rejections created by improper finger selection and/or placement. Often such systems do not indicate to the user which finger is to be placed on the platen. To the contrary, some systems include written instructions and/or graphics intended to direct the user with respect to finger selection. These systems, however, can be complicated for the user and/or can be language dependent and thus can have the unintended overall effect of slowing passage through the system. Moreover, conventional biometric fingerprint systems do little to assist the user with correct placement of the fingerprint portion of the finger upon the platen.

Thus, a device is needed for biometric fingerprint systems, and particularly for high-volume biometric fingerprint systems, which would encourage a user to expose the correct designated finger to the fingerprint scanner and which would facilitate a proper placement of the designated finger on the platen of the scanner and do such in a simple and quick manner without depending upon written, graphic, or sounded instructions.

SUMMARY OF THE INVENTION

Embodiments of the invention include a finger guide device for a biometric fingerprint scanner, the device including a raised portion, a channel formed into the raised portion and extending from about a front side of the raised portion to about a rear side thereof, an aperture formed through the device at the channel, finger selection contours configured to visually indicate to a user to place an index finger in the channel, and finger direction contours configured to direct a finger placed in the channel toward the aperture.

Other embodiments include a biometric finger print scanning system including a scanner device, a platen disposed on the scanner device, and a finger guide disposed on the platen including a longitudinal channel and an aperture formed through the guide at the channel, where the finger guide comprises finger selection contours configured to visually indicate to a user to place an index finger the channel and finger direction contours configured to direct a finger placed in the channel toward the aperture.

Additional embodiments including a finger guide device for a biometric fingerprint scanner, the device including a raised portion having a generally circular disk shape, a channel formed into the raised portion and extending from a front side of the raised portion to a rear side thereof, an aperture formed through the device at the channel, a sloped surface descending to the aperture at a front side of the aperture, a stop surface disposed at a rear side of the aperture, where the channel has a width which gradually decreases in a direction toward the rear side of the raised portion, where the stop surface is configured to position a finger of a user in the aperture and further configured to allow a fingernail of the finger to extend in the channel toward the rear side of the raised portion.

BRIEF DESCRIPTION OF THE DRAWINGS

Further features, aspects and advantages of the apparatus and methods of the embodiments of the invention will become better understood with regard to the following description, appended claims, and accompanying drawings.

DESCRIPTION OF EXEMPLARY EMBODIMENTS

FIGS. 1-8 show various illustrative views of an ergonomic finger guide 10 for a biometric finger scanner (not shown), in one exemplary embodiment of the invention.

The guide 10 includes a first raised portion 12 and a second raised portion 14 disposed on opposite sides of a finger channel 16. The first and second raised portions 12 and 14 extend from a base 18 and include a height $H_1$ of about 0.75". The first and second raised portions 12 and 14 each included a rounded edge 20 extending entirely around the respective portion 12, 14. Upper surfaces 22 and 24 of the first and second raised portions 12 and 14, respectively, are generally planner and extend generally parallel to the base 18 of the guide 10.

Figure 5:
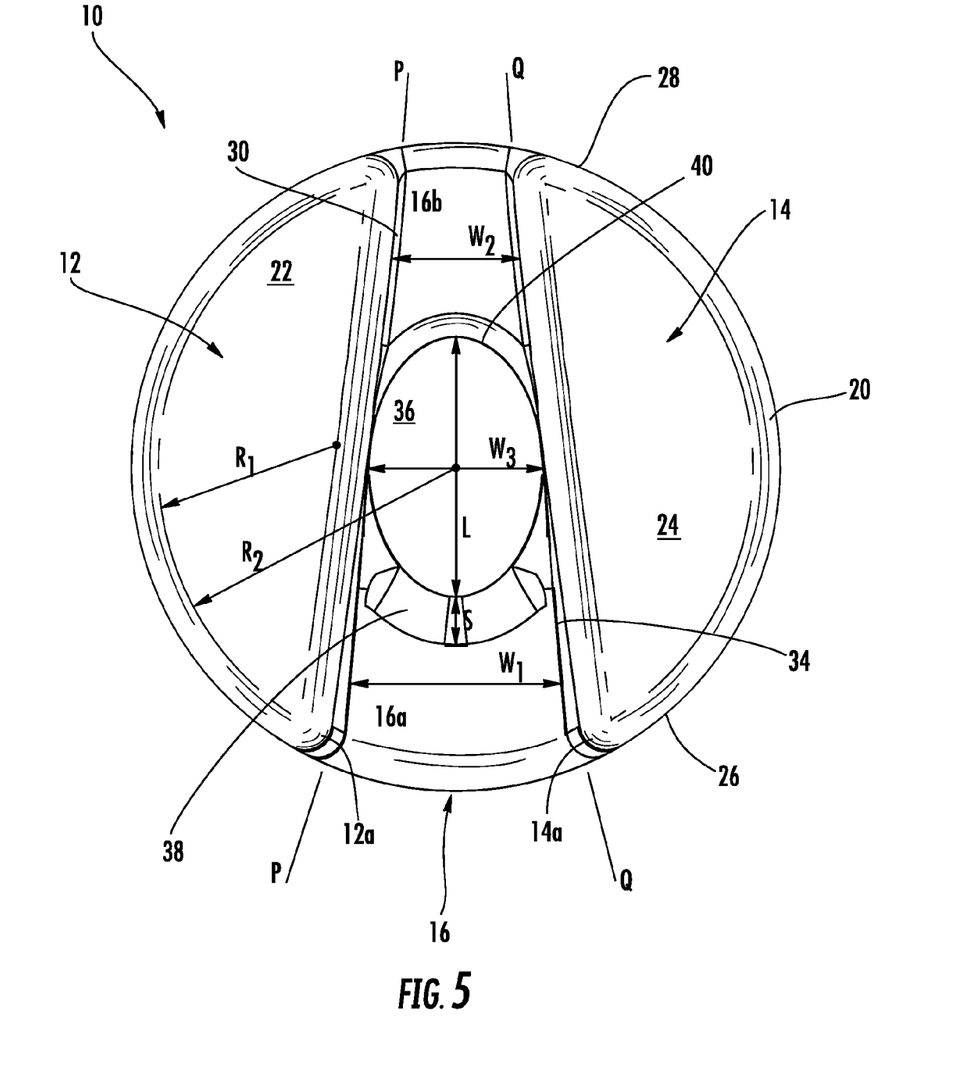
FIG. 5 is a top plan view thereof.
Figure 6:
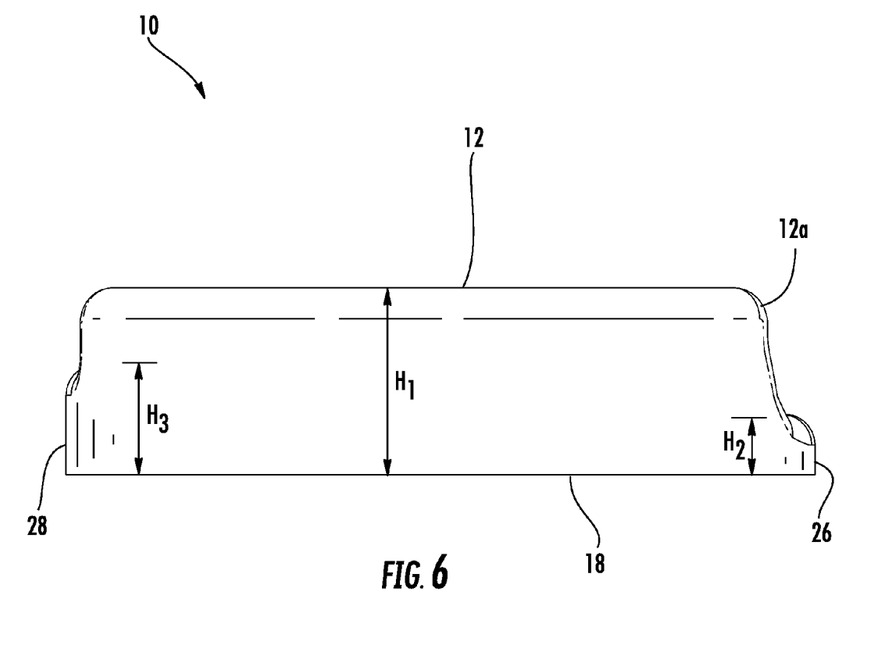
FIG. 6 is another side view thereof.

In this exemplary embodiment, the guide 10 is generally disk shaped. That is, the finger guide 10 includes a circular shape when seen from above as in FIG. 5 and includes a generally consistent thickness $H_1$. Accordingly, the raised portions 12 and 14 of the guide 10 are substantially semi-circular in shape when viewed from above as shown in FIG. 5. The semi-circular raised portions 12 and 14 each include a radius $R_1$ which is less than a radius $R_2$ of the finger guide 10 in its entirety. For example, $R_1$ is approximately 0.79" to approximately 1.42" and $R_2$ is approximately 1.20" to approximately 1.60" and is preferably about 1.36". This difference in radii effectively delimits the finger channel 16 which will now be discussed in detail.

The channel 16 extends essentially diametrically across the circular shape of the finger guide 10, as can best be seen in FIG. 5. That is, the channel 16 extends from a front side 26 of the finger guide 10 to an opposing rear side 28 thereof. The channel 16 is bordered on one side by the first raised portion 22 and on a opposite side by the second raised portion 24. The finger channel 16 includes a first channel wall 30 which extends entirely along the first raised portion 12 and which descends to a bottom surface 32 of the channel 16. The finger channel 16 further includes a second channel wall 34 which extends along the second raised portion 24 and which also descends to the channel bottom surface 32. As shown in the drawings, the channel walls 30 and 34 extend with a slight inward curve from the rounded edge 20 to the channel bottom surface 32. That is, the channel walls 30 and 34 are slightly concave. See, e.g., FIG. 2.

The first and second channel walls 30 and 34 extend in a non-parallel manner across the width W of the finger guide 10. That is, as can be seen in FIG. 5, the first channel wall 30 generally extends along a line P and the second channel wall 34 extends generally along a line Q where the lines P and Q gradually converge toward each other. The overall effect is that the channel 16 has a decreasing width in a direction from the front side 26 of the guide 10 to the rear side 28. For example, in FIG. 5, $W_1$ is about 1.1" and $W_2$ is about 0.58".

The finger guide 10 of the instant illustrative embodiment further includes an aperture 36 formed through the guide 10 at the channel 16. The aperture 36 is disposed substantially centrally relative to the guide 10 and is specifically formed in the channel 16 through the bottom surface 32 thereof. The aperture 36 is generally oval in shape as can best be seen in FIG. 5. In this example, the aperture has a length L of approximately 1.20" and a width $W_3$ of approximately 0.80".

The aperture 36 generally divides the channel 16 into a front portion 16a disposed proximate to the front side 26 of the finger guide 10 and a rear portion 16b disposed proximate to the rear side 28 of the guide 10.

The front portion 16a of the of the channel bottom surface 32 is generally planar and extends from the front side 26 of the finger guide 10 to a slope 38 which descends from the front portion 16a of the channel bottom surface 32 to the aperture 36. The slope 38 extends from the first channel wall 30, around the curvature of the oval aperture 36 to the second channel wall 34. As shown in FIG. 5, the slope 38 extends for a length S of about 0.30".

Figure 1:
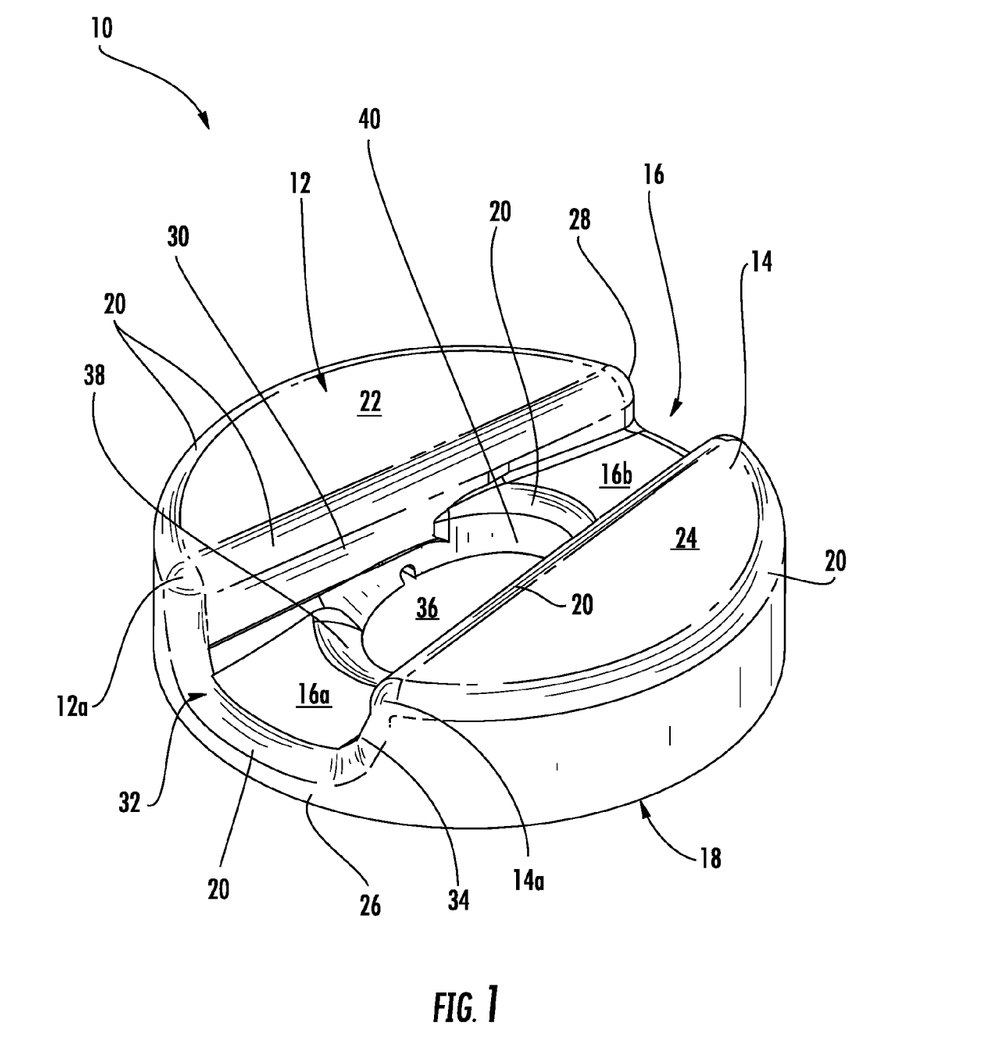
FIG. 1 is a perspective view of an ergonomic finger guide for use with a biometric fingerprint scanner.
Figure 2:
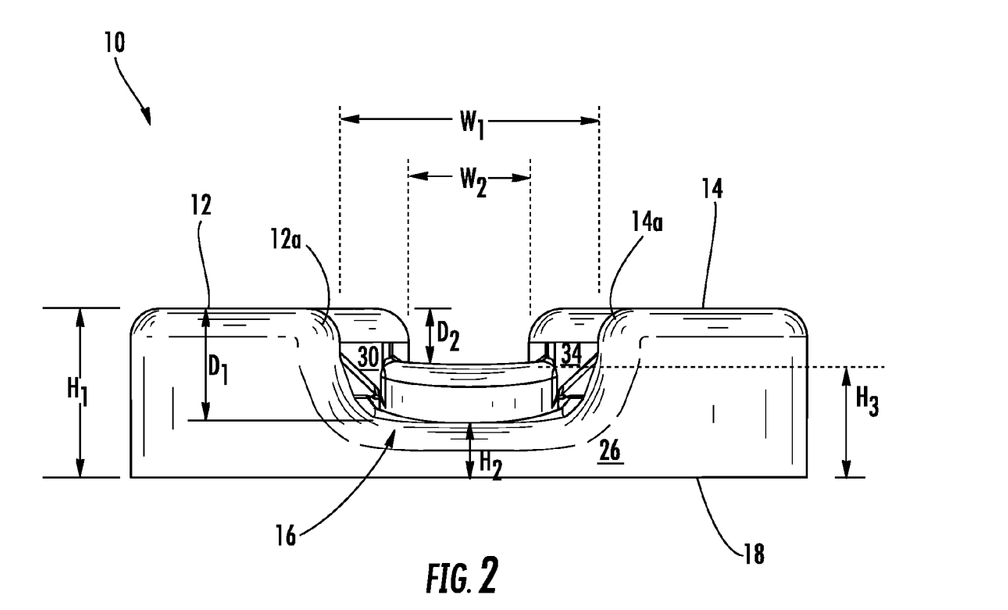
FIG. 2 is a front elevation view thereof.
Figure 3:
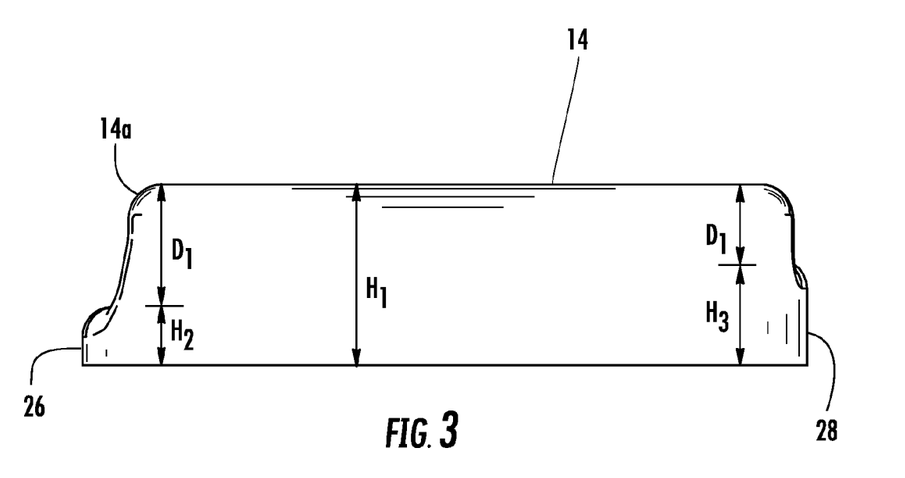
FIG. 3 is a side elevation view thereof.
Figure 4:
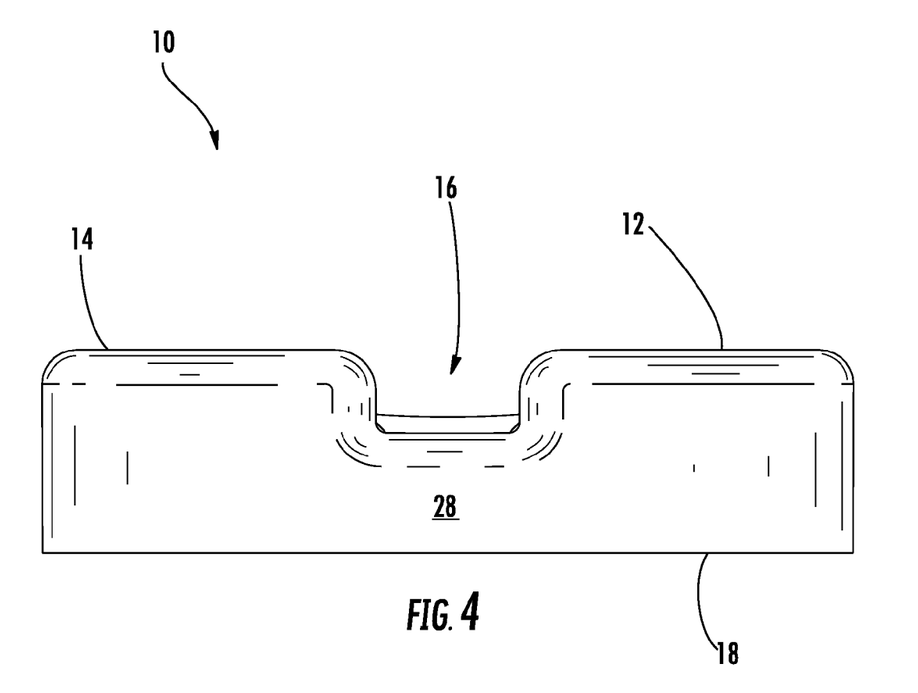
FIG. 4 is a rear elevation view thereof.

While it is mentioned that the front portion 16a of the channel bottom surface 32 is generally planar, the front portion 16a includes a slight contouring to facilitate reception of a user's finger. For example, as can be seen in FIGS. 1 and 2, The front portion 16a has a slightly curved profile across its width. That is, sides of the front portion 16a proximate to the first and second channel walls 30 and 34 curve slightly to meet the channel walls 30 and 34. The front portion 16a of the channel 16 includes a height $H_2$ of about 0.24" relative to the base 18.

The channel bottom surface 32 at the front side 26 of the finger guide includes the rounded edge 20 described previously. This rounded edge 20, as discussed, extends along numerous features of the finger guide 10 and generally includes an internal radius of about 0.125" to about a 0.40" and preferably includes an internal radius of about 0.125".

The rear portion 16b of the channel 16 comprises a substantially planar portion of the channel bottom surface 32. This planar portion 16b extends from a stop surface 40 toward the rear side 28 of the finger guide 10.

The stop surface 40 extends around a rear edge of the aperture 36 from the first channel wall 30, along the planar portion 16b of the channel bottom surface 32, to the second channel wall 34. The stop surface 40 include a height $H_3$ of about 0.44". The stop surface 40 descends substantially vertically from the rounded edge 20 of the planar portion 16b downward to the base 18.

As mentioned, the channel 16 includes a width $W_1$, $W_2$, which varies across the length of the channel 16. Similarly, a depth of the channel 16 varies across the length thereof. For example, at the front side 26 of the finger guide 10, the channel 16 includes a depth $D_1$ of about 0.51". Whereas, at the rear side 28 of the guide 10, the channel 16 includes a depth $D_2$ of about 0.31". See, e.g., FIG. 2.

Figure 7:
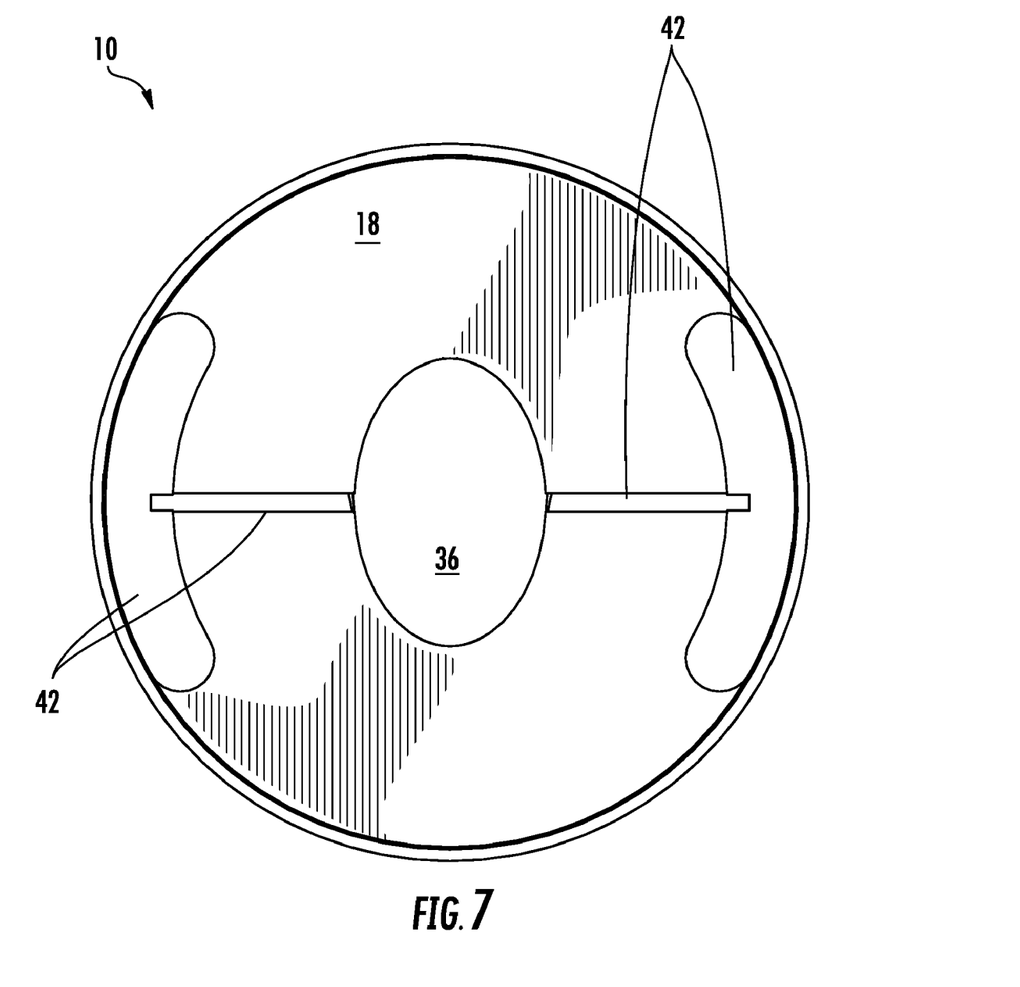
FIG. 7 is a bottom plan view thereof.
Figure 8:
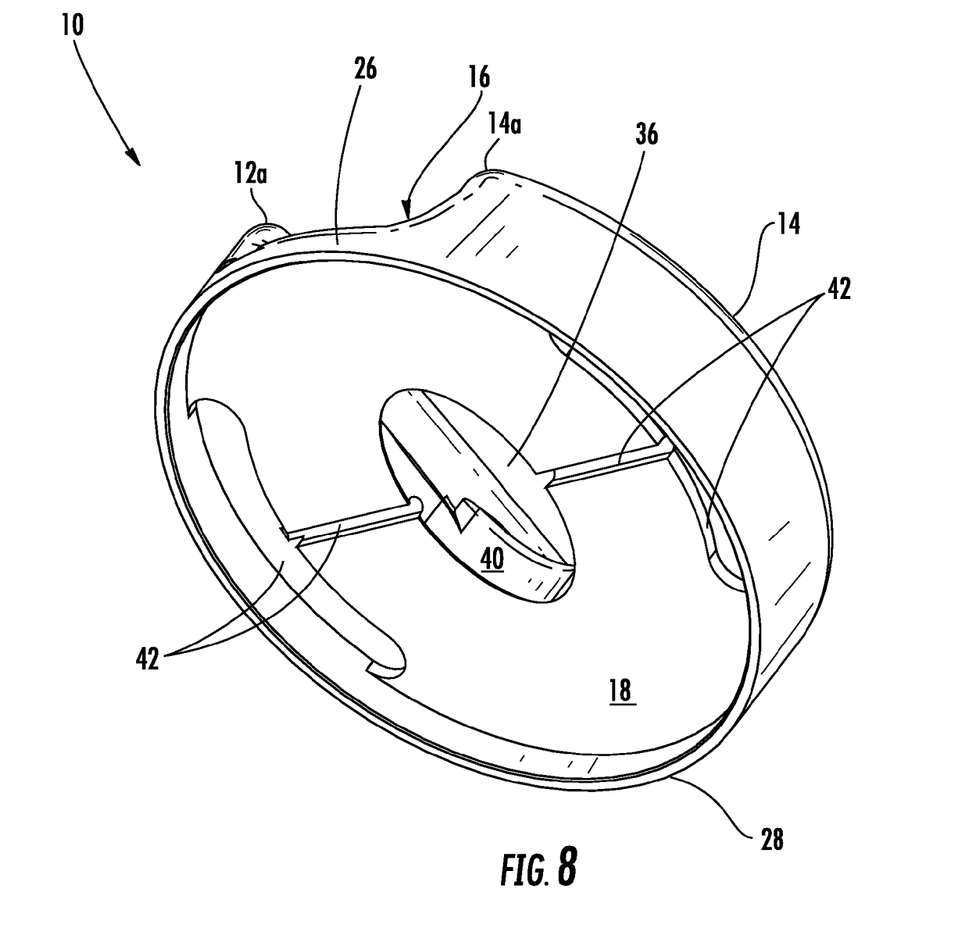
FIG. 8 is a bottom perspective view thereof.

The base 18 of the finger guide 10 is generally planar and is configured to facilitate mounting of the guide 10 upon a biometric fingerprint scanner. Particularly, the guide includes mounting features 42 formed on the base 18 as can be seen in FIGS. 7 and 8. These mounting 42 features comprise grooves, slots, clips, tabs, etc. which are configured to mate with or receive portions of the biometric fingerprint scanner. The mounting features 42 are configured to create a friction-fit, snap-fit screw-fit, with the fingerprint scanner. Additionally and/or alternatively, the mounting features 42 can facilitate an adhesive or welded bond between the guide 10 and the fingerprint scanner.

In use, the guide 10 is disposed on a biometric fingerprint scanner by any convenient means and is positioned thereon such that the aperture is located on the platen of the scanner immediately above the scanning element and such that the front side 26 of the guide 10 faces a user. The guide 10 is fixedly disposed on the biometric fingerprint scanner, for example by any of the means mentioned above, such that access attempts at the scanner will not dislodge the finger guide 10. A user seeking access approaches the finger guide 10 mounted on the scanner, the user extends their index finger, and places the finger in the channel 16 such that the forward portion of the index finger containing the fingerprint is positioned within the aperture 36 and in contact with the platen of the biometric scanner. Thus, the index fingerprint of the user has been isolated and precisely positioned on the platen to facilitate scanning thereof.

The finger guide 10 is particularly configured to visually and tactily suggest to the user to present the index finger to the guide 10, to insert the index finger into the channel 16, and to place the fingerprint portion of the index finger in the aperture 36 upon the platen. This is largely because the unique size, shape, and various ergonomic features of the finger guide 10 were determined and developed after conducting extensive research with regard to average index finger shape and size and further with regard to test samples' tendencies to select a particular finger for scanning in response to various finger guide designs.

Particularly, the substantially round shape of the finger guide 10 and the extending finger channel 16 suggest to the user to use the index finger during an access attempt. First, the shape and size of the channel 16 create a visual "highway" which is receptive to the index finger. That is, the size of the channel 16 and the converging nature thereof visually encourages the user to place the index finger therein for scanning.

Further, the physical configuration of the guide 10 ergonomically facilitates index finger access attempts. Generally, a finger may enter the channel from the front side 26 of the guide 10 and slide over the front portion 16a of the channel 16 and eventually into the aperture 36. Alternatively, a finger may enter the channel 16 and be placed in the aperture 36 from a position above the guide by the user employing a simple downward movement. In both instances, the configuration of the guide 10 encourages the user to use the index finger. This is because, the index finger may be readily placed in an extended, pointed position, thus isolating this finger such that the pointed index finger may easily be slid or lowered into the channel 16 without other parts of the hand striking or otherwise interfering with the guide 10. Since, physiologically, it is more difficult to place other digits into an isolated pointed position, the user would tend to select and point the index finger during an access attempt at the guide 10.

Even if a user chose not to point or otherwise isolate a finger for an access attempt, the configuration of the guide 10 still encourages use of the index finger. This is because the remaining non-inserted fingers may easily be placed on the upper surface 22, 24 of the adjacent raised portion 12, 14 while the non-pointed index finger is lowered or slid into the channel. For example, if a user approaches the finger guide with the right hand, the index finger may be slid or lowered into the channel 16 and the remaining three fingers (i.e., middle, ring, and pinky) may be comfortably placed upon the upper surface 24 of the second raised portion 14. In this scenario, the thumb would likely not contact the guide 10 and thus not interfere with the access attempt. To the contrary, if a user attempted to slide the second finger into the channel 16, the user's index and/or third finger would like contact the front side 26 of the guide 10 and thus obstruct the access attempt. Similarly, if a user attempted to lower the second finger into the channel 16 from above for an access attempt, the index and/or third finger would contact the first and/or second raised portions 12 and 14 and obstruct or render inconvenient the placement of the third finger fingerprint in the aperture 36.

Here it is noted that a corner 12a of the first raised portion 12 of the guide 10 substantially resembles the intersection of the index finger and thumb on the right hand; that is, the angles and shapes are quite similar. This feature 12a creates a visual indication to the user to place the right hand has just discussed, i.e., the right index finger in the channel 16, the thumb off of the guide 10, and the remaining three fingers rested upon the second raised portion 14. In this orientation, the corner 12a would lie comfortable between the index finger and the thumb. The second raised portion 14 includes a similar corner 14a which resembles the shaping of the left hand and similarly invites placement thereof in the same manner as discussed with regard to the right hand.

In addition to providing the user with intuitive indication to use the index finger for an access attempt, the finger guide 10 is further configured to ensure precise placement of the fingerprint of the index finger upon the underlying scanning device platen. For example, the slope 38 of the front portion 16a of the channel bottom surface 32 ergonomically urges a finger inserted into the channel 16 in a direction toward the aperture 36. That is, the slope 38 is specifically dimensioned and contoured such that a finger of a user which falls on the slope 38 during an access attempt will slide down the slope and eventually into the aperture where the fingerprint portion of the finger contacts the platen. The stop surface 40 on the opposite side of the aperture 36 prevents a finger inserted into the aperture 36 from traversing across the aperture 36 and resulting in a misaligned position relative to the scanning element disposed beneath the platen. The stop surface 40 includes the height $H_3$ which is specifically configured to provide the mentioned stop feature and is also specifically configured to allow a finger nail of an inserted finger to extend beyond the aperture 36. Thus, if a finger with a long fingernail is inserted into the channel 16 and aperture 36, the fingernail extends over the stop surface 40 and across the rear portion 16b of the channel 16 so as not to interfere with or otherwise effect the proper and precise placement of fingerprint portion upon the platen.

Furthermore, the rounded edges extending along first and second raised portions 12 and 14 and the curvature of the channel walls 30 and 34 contribute to directing a finger which is inserted into the channel 16 into a proper position relative to the platen. For example, if during an access attempt, a user's index finger does not enter the channel 16 cleanly, but instead strikes the rounded channel edge 20, the shape, size and contouring of the edge 20 naturally direct the finger into the channel 16. Additionally, once in the channel 16, the finger is directed toward the aperture 36 by the curvature of the channel walls 30 and 34.

The finger guide 10, discussed herein in detail, is of course exemplary and is offered to illustrate one embodiment of the invention. The finger guide, and the various features thereof, may include alternate shapes, sizes, and configurations within the broad scope of the invention. For example, the finger guide may be oval or rectilinear in shape, it may be integrally formed upon a fingerprint scanner, the aperture may be circular or rectilinear in shape, the channel may have a semi-circular rectangular cross-section, the stop surface may be angled relative to the base, etc. Essentially, the finger guide may include any shape and/or dimensions which indicate to the user that a particular finger is to be presented to the biometric scanner and which facilitate in guiding that finger to the platen of the scanner.

Accordingly, embodiments of the invention provide a device used in conjunction with a biometric fingerprint scanning system where the device is particularly configured to indicate, visually and with tactile response, which finger is to be presented to the scanner and in which position the finger is to be placed upon the platen of the scanner. More particularly, the embodiments of the invention provide a device which may be fixed on an existing biometric fingerprint scanner where the device indicates to the user that an index finger is to be presented to the scanner and further indicates and facilitates placement of the fingerprint portion of the index finger upon the platen. This intuitive indication is provided by the shape and dimensions of the device, without requiring complex written instructions or detailed graphics.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. A finger guide device for a biometric fingerprint scanner, the device comprising:
   a raised portion;
   a channel formed into the raised portion and extending from about a front side of the raised portion to about a rear side thereof, wherein the channel has a width which decreases by about 50 percent between said front side and said rear side thereof;
   an aperture formed through the device at the channel;

finger selection contours comprising at least one of the aperture having an oval shape, a sloped surface at a front side of the aperture, and a stop surface at a rear side of the aperture; and finger direction contours configured to direct the index finger placed in the channel toward the aperture.

2. The finger guide device of claim 1, wherein the raised portion includes a substantially circular disk shape.

3. The finger guide device of claim 1, wherein the channel extends entirely from the front side to the rear side of the raised portion and wherein the width gradually decreases in a direction toward the rear side.

4. The finger guide device of claim 1, wherein the channel is delimited by opposing wall portions which extend between the front and rear sides of the raised portion and wherein the wall portion generally converge toward each other in a direction toward the rear side of the raised portion.

5. The finger guide device of claim 1, wherein the aperture is formed substantially centrally in the channel, wherein the channel includes a sloping surface proximate to the front side of the raised portion, wherein the sloping surface descends gradually toward the aperture, and wherein the channel includes a stop surface adjacent to the aperture and opposite from the sloping surface.

6. The finger guide device of claim 5, wherein the stop surface is configured to abut the index finger placed in the aperture and is further configured to allow a fingernail of the index finger to extend beyond the stop surface.

7. The finger guide device of claim 6, wherein the aperture has a length of about 1.2" and a width of about 0.80".

8. The finger guide device of claim 1, wherein the finger selection contours comprise the raised portion including a substantially circular disk-like shape having a diameter of about 3.0".

9. The finger guide device of claim 1, wherein the finger selection contours comprise opposing walls of the channel which delimit the channel and which converge toward one another over a length of the device.

10. The finger guide device of claim 1, wherein the finger direction contours comprise at least one of the aperture having an oval shape, a sloped surface disposed at a front side of the aperture, and a stop surface disposed at a rear side of the aperture.

11. The finger guide device of claim 1, wherein the finger direction contours comprise a width of a channel decreasing in a direction from the front side of the raised portion to the rear side.

12. The finger guide device of claim 1, wherein the finger direction contours comprise at least one of rounded edges of the channel and a curved cross-section of the channel.

13. The finger guide device of claim 1, wherein the finger selection contours comprise a first and a second corner feature, each delimited by the raised portion and by a terminus of the channel, the first and second corner features disposed at the front side of the raised surface, the first corner feature disposed on a first side of the channel, and the second corner feature disposed on an opposite second side of the channel.

14. The finger guide device of claim 13, wherein the first corner feature is configured to engage or to be disposed proximate to a portion of the user's right hand defined by the intersection of the index finger and thumb of the right hand when said index finger of the user is said positioned in the aperture.

15. The finger guide device of claim 14, wherein the second corner feature is configured to engage or to be disposed proximate to a portion of the user's left hand defined by the intersection of the index finger and thumb of the left hand when said index finger of the user is said positioned in the aperture.

16. A biometric finger print scanning system, comprising:
a scanner device;
a platen disposed on the scanner device; and
a finger guide disposed on the platen having a front side and a rear side thereof, said finger guide further including a longitudinal channel having a width that decreases by about 50 percent between said front side and said rear side thereof and an aperture formed through the guide at the channel;
wherein the finger guide comprises finger selection contours comprising at least one of the aperture having an oval shape, a sloped surface at a front side of the aperture, and a stop surface at a rear side of the aperture; and
finger direction contours configured to direct the index finger placed in the channel toward the aperture.

17. The system of claim 16, wherein the finger selection contours comprise the guide including a substantially circular disk-like shape having a diameter of about 3.0".

18. The system claim 16, wherein the finger selection contours comprise opposing walls of the channel which delimit the channel and which converge toward one another over a length of the device.

19. The system of claim 16, wherein the finger direction contours comprise at least one of the aperture having an oval shape, a sloped surface disposed at a front side of the aperture, and a stop surface disposed at a rear side of the aperture.

20. A finger guide device for a biometric fingerprint scanner, the device comprising:
a raised portion having a generally circular disk shape;
a channel formed into the raised portion and extending from a front side of the raised portion to a rear side thereof;
an aperture formed through the device at the channel;
a sloped surface descending to the aperture at a front side of the aperture;
a stop surface disposed at a rear side of the aperture;
wherein the channel has a width which gradually decreases by about 50 percent between said front side and said rear side thereof in a direction toward the rear side of the raised portion;
wherein the stop surface is configured to position a finger of a user in the aperture and further configured to allow a fingernail of the finger to extend in the channel toward the rear side of the raised portion.

21. A finger guide device for a biometric fingerprint scanner, the device comprising:
a raised portion having a substantially circular disk shape;
a channel formed into the raised portion and extending from a front side of the raised portion to a rear side thereof and having a width greater at the front side than at the rear side wherein the width gradually decreases by about 50 percent between said front side and said rear side thereof in a direction toward the rear side, said channel being delimited by opposing wall portions which extend between the front and rear sides of the raised portion and wherein the wall portion generally converge toward each other in a direction toward the rear side of the raised portion;
an aperture formed through the device at the channel having a sloping surface proximate to the front side of the raised portion and descending gradually towards the aperture,
wherein the channel includes a stop surface adjacent to the aperture and opposite from the sloping surface, the stop surface being configured to abut a finger placed in the aperture and further configured to allow a fingernail of the finger to extend beyond the stop surface;

finger selection contours comprising the raised portion having a substantially circular disk-like shape and at least one of the aperture having an oval shape, a sloped surface at a front side of the aperture, and a stop surface at a rear side of the aperture; and finger direction contours configured to direct the finger placed in the channel toward the aperture, the finger direction contours include a width of a channel decreasing in a direction from the front side of the raised portion to the rear side and at least one of rounded edges of the channel and a curved cross-section of the channel, wherein the finger direction contours further include at least one of the aperture having an oval shape, a sloped surface disposed at a front side of the aperture, and a stop surface disposed at a rear side of the aperture.

* * * * *